2 Sheets--Sheet 1.
E. H. STEARNS.
Circular Saw-Mills.
No. 141,672.
Patented August 12, 1873.
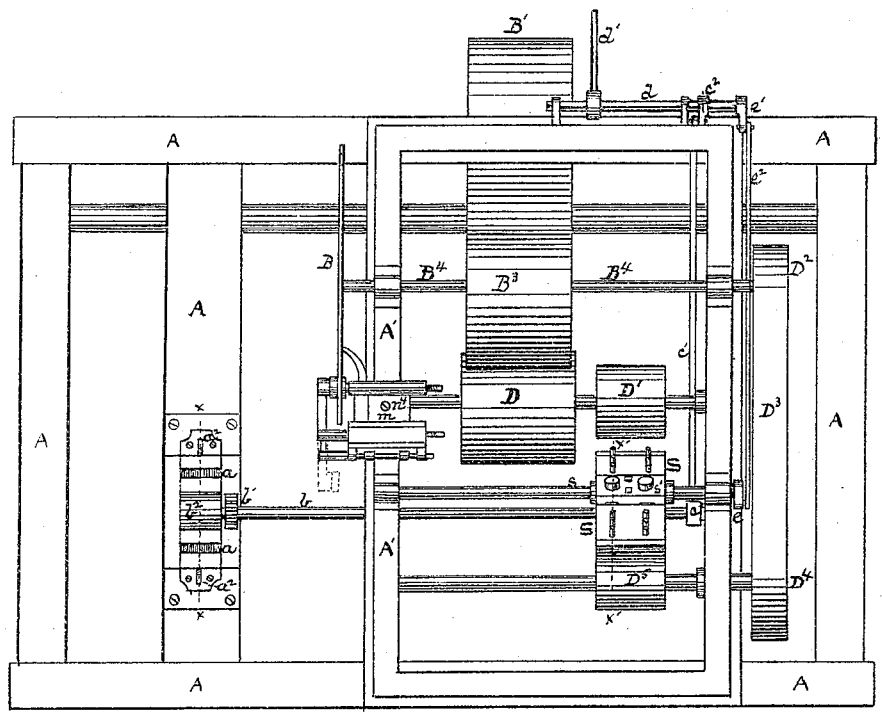
Fig. 1.
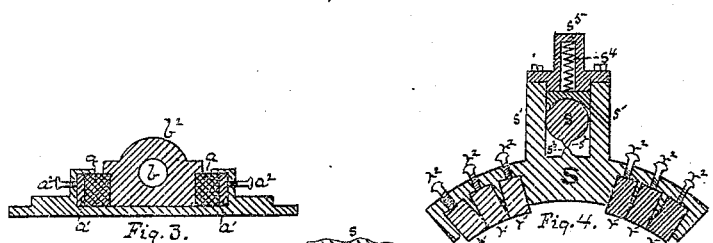
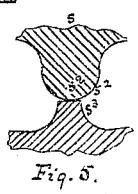
Fig. 3.   Fig. 5.   Fig. 4.
Witnesses
James B. Kay
E. C. Fitler
Inventor
Edward H. Stearns,
by Bakewell, Christy & Kerr,
his Att'ys.
AM. PHOTO-LITHOGRAPHIC CO. N.Y. (OSBORNE'S PROCESS.)

2 Sheets--Sheet 2.

E. H. STEARNS.
Circular Saw-Mills.

No. 141,672. Patented August 12, 1873.

Witnesses
James D. Kay
E. C. Fitler.

Inventor
Edward H. Stearns,
by Bakewell, Christy & Kerr,
his Att'ys.

UNITED STATES PATENT OFFICE.

EDWARD H. STEARNS, OF ERIE, PENNSYLVANIA.

IMPROVEMENT IN CIRCULAR-SAW MILLS.

Specification forming part of Letters Patent No. 141,672, dated August 12, 1873; application filed March 26, 1873.

*To all whom it may concern:*

Be it known that I, EDWARD H. STEARNS, of Erie, in the county of Erie and State of Pennsylvania, have invented a new and useful Improvement in Circular-Saw Mills; and I do hereby declare the following to be a full, clear, and exact description thereof, reference being had to the accompanying drawing in two sheets making a part of this specification, in which—

Figure 2:
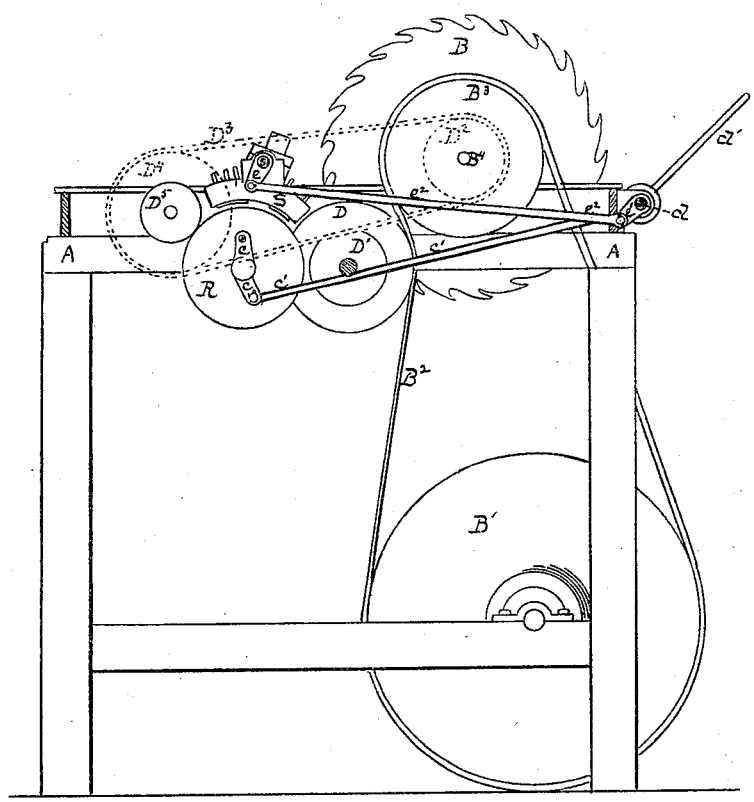
Figure 6:
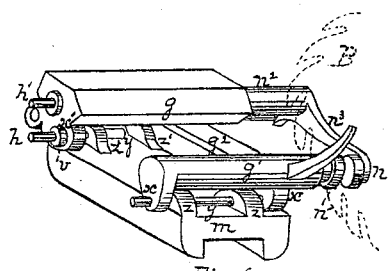
Figure 7:
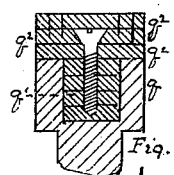

Figure 1, Sheet 1, is a plan view of my improved machine. Fig. 2, Sheet 2, is a side elevation of so much thereof as relates to the driving, reversing, and braking apparatus. Fig. 3, Sheet 1, is a sectional view in the line $x\,x$, Fig. 1, through the bearings of the rag-wheel shaft, at the end which comes under the carriage. Fig. 4, Sheet 1, is a sectional view through the brake in the line $x'\,x'$, Fig. 1. Fig. 5, Sheet 1, is an enlarged detached sectional view, showing the peculiar form of the cam devices which apply the brake. Fig. 6, Sheet 2, is an enlarged perspective view of the saw-guides; and Fig. 7, Sheet 2, is a sectional view of one of the guide-blocks used in the saw-guides.

Like letters of reference indicate like parts of each.

My invention relates to improvements in the rag-wheel bearings, brakes, reversing apparatus, and saw-guides of a circular-saw mill.

To enable others skilled in the art to make and use my invention, I will proceed to describe its construction and mode of operation.

The frame-work A is of any suitable construction. B is a circular saw of any suitable construction. The carriage and track, not shown in the drawings, are properly arranged on the frame A, so that the pinion $b^1$ on the rag-wheel shaft $b$ shall mesh accurately into the toothed rack on the under side of the carriage, in the manner ordinarily praticed. The function of this pinion is to run the carriage forward in feeding the log to the saw, and, on being reversed, to run it back preparatory to a new feed. To relieve, in part, the severe strain to which the devices would otherwise be subject, I arrange the bearings $b^2$ of this end of the rag-shaft $b$ between two cushions $a\,a$ of India rubber or other suitable elastic and flexible material. Back of each cushion is a plate, $a^1$, against which plays a set-screw, $a^2$, for the purpose of properly adjusting the box $b^2$, and regulating the range of movement of the box by compressing the cushions more or less. Power is communicated to the saw B in any suitable way. As shown in the drawings, it is communicated from a band-wheel, $B^1$, by the band $B^2$, which passes over a pulley, $B^3$, on the saw-mandrel $B^4$. At the same time it passes over the face of the pulley D, on the shaft of which is the gig-pulley $D^1$. From a pulley, $D^2$, on the saw-mandrel $B^4$ a band, $D^3$, extends forward and drives a pulley, $D^4$, on the shaft of which is the feed-pulley $D^5$. These friction-pulleys $D^1$ and $D^5$ are geared up so as to revolve in different directions, in the usual way and for the usual purposes, and they are hung in their bearings in such position with reference to the rag-wheel R that the latter may, for the purpose of reversing the motion of the carriage, be shifted from one to the other and be operated by either at pleasure. This end of the rag-shaft $b$ has its bearing in a swinging arm, $c$, from the lower end of which a rod, $c^1$, extends to a crank, $c^2$, on the rocking-shaft $d$, which latter is attached to the frame A and receives a rocking motion by means of a reversing lever, $d$. By this means the rag-wheel R may be shifted so as to be brought in gear with either of the friction-wheels $D^1$ or $D^5$. When in contact with $D^5$ the log will be fed to the saw, and when shifted to $D^1$ the log will be run back. While now the rag-wheel R is being shifted from $D^1$ to $D^5$ or back, it is desirable to apply a brake to it, so as, partially or wholly, to arrest its motion preparatory to a reversal. To accomplish this I make use of a brake, S, which is hung on a shaft, $s$. This shaft passes through a box, $s^1$, in the brake. On the under side of the shaft, where it goes through the box, is a bead, $s^2$, Figs. 4 and 5, which is in the nature of a cam, and which works against a bead or elevation, $s^3$, in the bottom of the box to force the brake down to the wheel. These beads, which constitute mechanically a cam, are so shaped and arranged that, by a rocking motion imparted to the shaft $s$, they shall engage each other as soon as the rag-wheel R leaves $D^1$ or $D^5$, and cause the brake to engage R while passing between $D^1$ and $D^5$. By the time the wheel R shall have engaged the opposite wheel the beads $s^2$ $s^3$ will have passed each other, and the brake will be raised clear of the wheel R by means of springs, $s^4$, arranged in the hollow boxes $s^5$. The rocking motion described is imparted to the shaft $s$ from the rocking-shaft $d$ by means of the crank $e$ $e^1$ and connecting-rod $e^2$; and these devices, with the reversing apparatus $c$ $c^1$ $c^2$, are so arranged relatively to each other that, by means of a single lever, $d^1$, the carriage is reversed, and the brake applied simultaneously; or, in other words, while the rag-wheel R is being shifted from one friction-roller to the other, the same motion which shifts it applies a brake to it during the time of its travel, and also releases the brake by the time such shifting travel is completed. The form of these beads which I find best is that shown in enlarged view in Fig. 5. As soon as the rag-wheel begins its shifting motion, the bead $s^2$ sliding suddenly on the abrupt slope of the bead $s^3$ forces it down and applies the brake quickly. The upper surface of the bead $s^3$ is flat, or nearly so, and of such breadth that the brake will be held down by the bead $s^2$ passing over it until just as the rag-wheel ends its shifting motion, or an instant before, when the bead $s^2$ slides quickly and abruptly down the opposite slope, and the brake is off. The brake is thus held firmly to the wheel during the whole of its shifting motion, it being applied and released with full force instantly at the beginning and end of the shifting travel of the wheel.

In the combinations thus far described any suitable construction of brake may be employed, but I have devised and shown what I believe to be an improvement in the brake itself.

The brake $s$ is preferably cast in one piece, with a series of boxes, of rectangular or other suitable form, both lengthwise and crosswise. I then cut from a board, which is as wide as the boxes are long, a series of rubber blanks, each blank being as long lengthwise of the grain of the wood as the boxes are deep. One such blank is then inserted in each box, as at $r^1$, so that the end of the grain shall be presented to the wheel R, to act as a rubber. As the wooden blocks wear off they are set down by means of set-screws $r^2$.

In this way I make a durable brake at small cost, and one in which the rubber part is easily adjusted, and as easily renewed when worn out.

The remainder of my invention relates to the saw-guides. On the rail $A^1$ I arrange a sliding carriage, $m$, Figs. 1 and 6, and having set it at any desired point, fix it in position by a set-screw, $n^4$. On the upper part of the sliding carriage $m$ are four perforated lugs, $z$ $z$ $z'$ $z'$, Fig. 6. Two hollow sockets, $g$ $g^1$, connected together by a rigid bar, $g^2$, carry the guides $n$ $n^1$. By means of perforated lugs $x$ $x$ $x'$ and rods $y$, these hollow sockets are connected with the lugs $z$ $z'$ in such way that the sockets $g$ $g^1$ can be set over to or from the saw, and this is accomplished by an adjusting-screw, $h$, the collars $v$ $v$ of which engage a lug, $x'$, of one of the sockets $g$ or $g^1$. One of the hollow sockets $g$ carries the rotating stem $n^2$, the forward end of which projects outside and beyond the periphery of the saw, where it carries, by an arm, $n^3$, the outer saw-guide, $n$. As the stem $n^2$ rotates freely upward and over in its socket $g$, the guide $n$ may be thrown over to the position shown in dotted lines in Fig. 1, where it is out of the way whenever its presence is not desirable. The stem of the other guide, $n^1$, is in the other socket, $g^1$. The stem $n^2$ is adjusted so as to set the guide $n$ to or from the saw by a set-screw, $h'$. The working-faces of these guides are built up of leather or rawhide, in the manner represented in Fig. 7, in which $q$ represents the base-block, with a socket bored in its outer end. A stem, $q^1$, of rawhide or other suitable material, is made of suitable size to fill this socket, and the layers $q^2$, of rawhide or leather, are built up on this stem and properly secured together. The stem and layers thus prepared constitute a rubber face or block for the guides, which may be simply attached by inserting the stem in the socket; and, as worn out, may, in like manner, be renewed.

What I claim as my invention, and desire to secure by Letters Patent, is—

1. The rocking-shaft $d$, attached to the frame A of the machine, with a crank, $c^2$, and rod $c^1$, connected directly to and in combination with the swinging arm $c$, which carries the end of the rag-shaft B, substantially as set forth.

2. The combination of rocking-shaft $d$ with crank and rod connections, both to the swinging arm $c$ and to the cam-shaft $s$, whereby the rag-wheel is shifted and the brake applied to it simultaneously by a single throw of the shaft $d$, substantially as described.

3. The brake S, made with a series of boxes of suitable form for receiving a series of wooden blocks, such blocks constituting the rubber, and being adjustable by set-screws $r^2$, substantially as set forth.

4. The combination of the spring $s^4$, the cam-shaft $s$ carrying the bead $s^2$, and the brake S carrying the bead $s^3$, constructed substantially as described, with reference to Figs. 4 and 5.

5. The combination of the sliding carriage $m$, adjustable guides $n$ $n^1$, and detachable rubber blocks $q^1$ $q^2$, substantially as set forth.

In testimony whereof I, the said EDWARD H. STEARNS, have hereunto set my hand.

EDWARD H. STEARNS.

Witnesses:
  GEO. P. GRIFFITH,
  E. L. FOOTE.